US010824626B2

(12) United States Patent
DeLuca

(10) Patent No.: US 10,824,626 B2
(45) Date of Patent: Nov. 3, 2020

(54) HISTORICAL COGNITIVE ANALYSIS FOR SEARCH RESULT RANKING

(71) Applicant: International Business Machines Corporation, Armonk, NY (US)

(72) Inventor: Lisa Seacat DeLuca, Baltimore, MD (US)

(73) Assignee: International Business Machines Corporation, Armonk, NY (US)

(*) Notice: Subject to any disclaimer, the term of this patent is extended or adjusted under 35 U.S.C. 154(b) by 169 days.

(21) Appl. No.: 15/281,733

(22) Filed: Sep. 30, 2016

(65) Prior Publication Data

US 2018/0095965 A1 Apr. 5, 2018

(51) Int. Cl.
*G06F 16/2457* (2019.01)
*G06F 16/248* (2019.01)
*G06F 16/242* (2019.01)
*G06F 16/9535* (2019.01)

(52) U.S. Cl.
CPC ...... *G06F 16/24578* (2019.01); *G06F 16/248* (2019.01); *G06F 16/2425* (2019.01); *G06F 16/24575* (2019.01); *G06F 16/9535* (2019.01)

(58) Field of Classification Search
CPC .......... G06F 17/3053; G06F 17/30395; G06F 17/30528; G06F 17/30554; G06F 16/24578; G06F 16/2425; G06F 16/24575; G06F 16/248
USPC ...................................................... 707/723
See application file for complete search history.

(56) References Cited

U.S. PATENT DOCUMENTS

| | | | |
|---|---|---|---|
| 8,606,725 B1* | 12/2013 | Agichtein | G06F 3/01 706/12 |
| 2005/0080771 A1* | 4/2005 | Fish | G06F 16/951 |
| 2007/0185860 A1* | 8/2007 | Lissack | G06F 16/9535 |
| 2007/0198506 A1* | 8/2007 | Attaran Rezaei | G06F 21/6218 |
| 2010/0168994 A1 | 7/2010 | Bourque et al. | |
| 2010/0324993 A1* | 12/2010 | Kacholia | G06Q 30/00 705/14.54 |
| 2011/0167058 A1* | 7/2011 | van Os | G06F 3/0482 707/722 |
| 2012/0158685 A1* | 6/2012 | White | G06F 17/30867 707/706 |
| 2013/0080426 A1* | 3/2013 | Chen | G06F 16/583 707/723 |

(Continued)

*Primary Examiner* — Hosain T Alam
*Assistant Examiner* — Saba Ahmed
(74) *Attorney, Agent, or Firm* — Scully, Scott, Murphy & Presser, P.C.; Stephanie Carusillo, Esq.

(57) ABSTRACT

A method, system, and computer program product are disclosed for generating search results. In an embodiment, a method comprises receiving a first search query from a user; determining a cognitive state of the user; receiving a second search query from the user; identifying results for the second query; and ranking the search results based, at least in part, on the cognitive state of the user when the user makes the first query. In an embodiment, the invention provides a system for generating search results, wherein a user makes a first search query and a cognitive state of the user is determined. In an embodiment, the system comprises one or more processing units configured for receiving a second search query from the user; identifying results for the second query; and ranking the search results based, at least in part, on the cognitive state of the user when the user makes the first query.

12 Claims, 3 Drawing Sheets

(56) References Cited

U.S. PATENT DOCUMENTS

| | | | |
|---|---|---|---|
| 2015/0286627 A1* | 10/2015 | Chang | G06F 17/2705 704/9 |
| 2016/0048762 A1* | 2/2016 | Sanchez | G06F 19/32 706/12 |
| 2016/0103833 A1* | 4/2016 | Sanders | G06F 17/30867 707/723 |
| 2016/0189037 A1* | 6/2016 | Pereg | G06N 5/04 706/12 |

* cited by examiner

HISTORICAL COGNITIVE ANALYSIS FOR SEARCH RESULT RANKING

BACKGROUND

This invention, generally, relates to computer searching, and more specifically, to ranking search results. Embodiments of the invention relate to using historical cognitive analysis for search result ranking.

As a general rule, search engines are able to return more relevant search results given more information about a search. A search query considered in isolation offers limited information about the intent of the searcher. Nevertheless, most search systems match user queries to documents independent of the interest and activities of the searcher beyond the current query.

In an attempt to provide more relevant results, more and more research is being conducted with respect to using knowledge of the interests of a searcher and to prior search context to improve various aspects of search technology (e.g., ranking query suggestion, query classification and so forth). User interests can be modeled using different sources of profile information, such as explicit location, demographic or interest profiles, or implicit profiles or context data based on previous queries, search result clicks, general browsing activities, or even richer desktop indices. Such implicit information can be based on long-term patterns of interaction, or on short-term patterns.

Users, advertisers and search engine providers all benefit from providing more relevant search results and improved search result ranking.

SUMMARY

Embodiments of the invention provide a method, system, and computer program product for generating search results from an input query from a user. In an embodiment, a method comprises receiving a first search query from a user; determining a defined cognitive state of the user when the user makes the first search query; receiving a second search query from the user; identifying a set of search results responding to the second search query; and ranking the set of search results based, at least in part, on the defined cognitive state of the user when the user makes the first search query.

An embodiment of the invention provides a system for generating search results from an input query from a user, wherein the user makes a first search query and a defined cognitive state of the user when the user makes the first search query is determined. In an embodiment, the system comprises one or more processing units configured for receiving a second search query from the user; identifying a set of search results responding to the second search query; and ranking the set of search results based, at least in part, on the defined cognitive state of the user when the user makes the first search query.

In embodiments of the invention, cognitive state analysis tools are employed to determine a user's mood, physical characteristics, experiences, and general mental state at the time they enter a search at a site. This cognitive state, along with the search information, is analyzed and stored. In the future, when the user returns to the site, the cognitive state of the user is again determined, then correlated with cognitive states from previous search sessions in order to modify search results presented to the user on the basis of the correlated cognitive state information and the prior purchase information.

DETAILED DESCRIPTION

Figure 1:
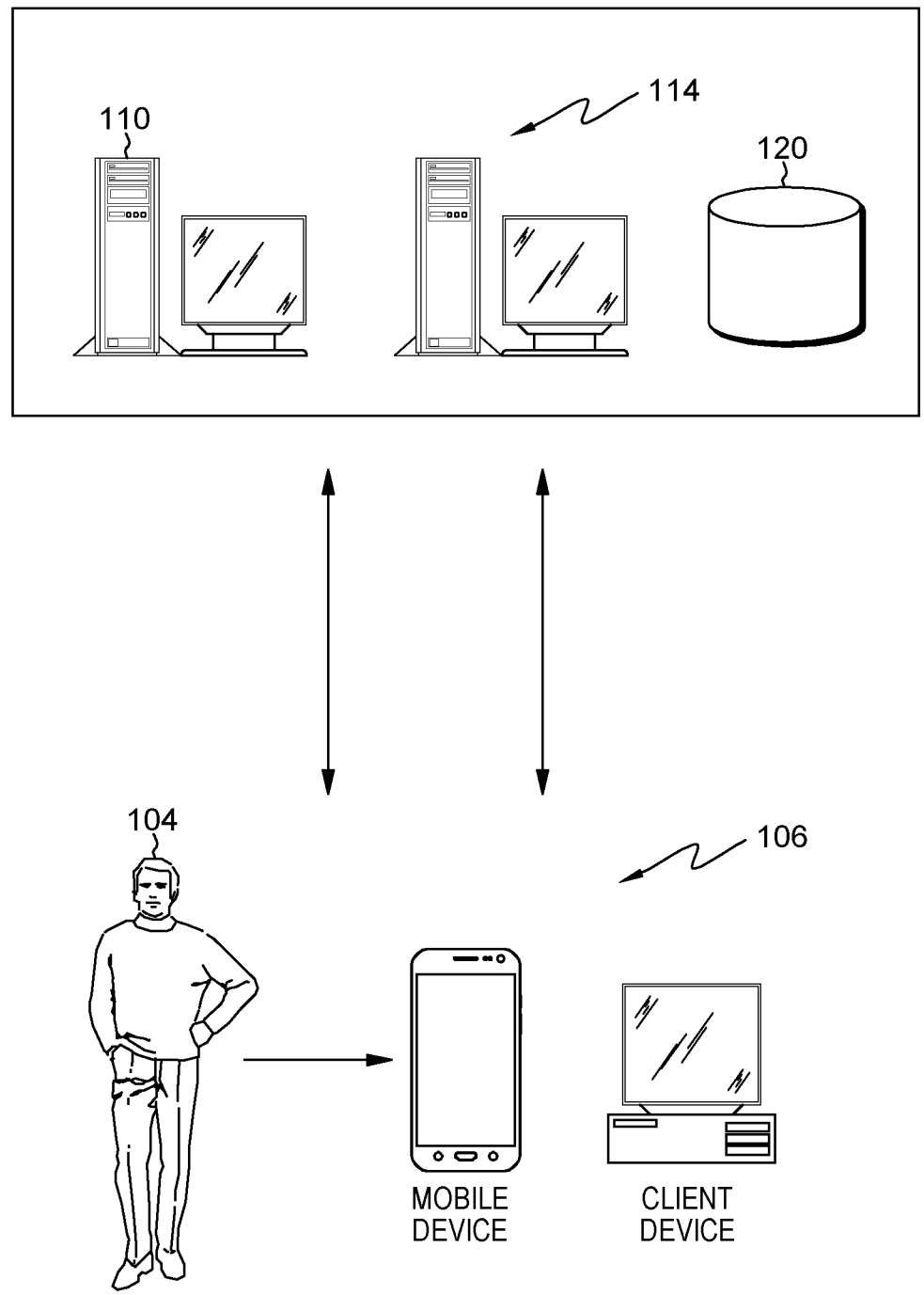
FIG. 1 shows a system for ranking search results in accordance with an embodiment of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This invention, generally, relates to computer searching, and more specifically, to ranking search results. Embodiments of the invention relate to using historical cognitive state analysis for search result ranking.

As discussed above, as a general rule, search engines are able to return more relevant search results given more information about a search. A search query considered in isolation offers limited information about the intent of the searcher. Nevertheless, most search systems match user queries to documents independent of the interest and activities of the searcher beyond the current query.

In an attempt to provide more relevant results, more and more research is being conducted with respect to using knowledge of the interests of a searcher and to prior search context to improve various aspects of search technology (e.g., ranking query suggestion, query classification and so forth). User interests can be modeled using different sources of profile information, such as explicit location, demographic or interest profiles, or implicit profiles or context data based on previous queries, search result clicks, general browsing activities, or even richer desktop indices. Such implicit information can be based on long-term patterns of interaction, or on short-term patterns.

Users, advertisers and search engine providers all benefit from providing more relevant search results and improved search result ranking.

For example, humans are largely creatures of habit. If they are experiencing similar life experiences, they will often exhibit similar behaviors. For example, assume an individual, Bob, is going through a major life event again (e.g., a new baby). It is likely he will exhibit similar behaviors (for instance, purchase or re-order similar items) to the last time a new baby entered his life. As another example, whenever a person, Mary, is sad, she likes to buy peanut butter candy. Thus, an analysis of the habits of people may be beneficial to ranking search results.

In embodiments of the invention, cognitive state analysis tools are employed to determine a user's moods, experiences, and general mental state at the time they enter a search at a site. This cognitive state, along with the search information, is analyzed and stored. In the future, when the user returns to the site, the cognitive state of the user is again determined, then correlated with cognitive states from previous search sessions in order to modify search results presented to the user on the basis of the correlated cognitive state information and the prior purchase information.

Figure 2:
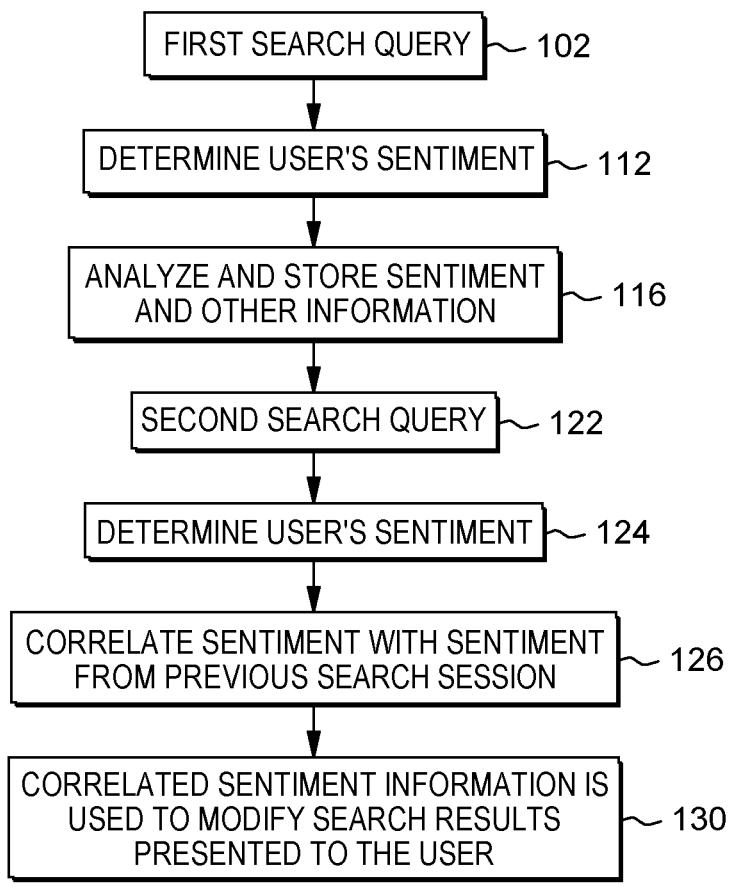
FIG. 2 illustrates a method for ranking search results according to an embodiment of the invention.

FIGS. 1 and 2 illustrate embodiments of the invention. At 102, a user 104 enters a search query via a computer device 106 such as a personal computer, a laptop computer, or a mobile computing device. The search query is processed by a search engine 110 to provide search results to the user. In addition, at 112, cognitive state analysis tools 114 are used to determine a defined cognitive state of the user at the time of this query. At 116, this cognitive state, along with other search information, is analyzed and stored in database 120.

At 122, user 104 makes a second search query. In embodiments of the invention, search engine 110 processes this search query and identifies search results. Also, at 124, when this query is made, the cognitive state analysis tools 114 are used to determine the cognitive state of the user at the time of this query. At 126, this latter cognitive state is correlated with the determined cognitive state at the time of the previous search query, and at 130, this correlated cognitive state information is used in order to modify the search results presented to the user on the basis of the correlated cognitive state information and, for example, prior purchase information.

Cognitive state is the attitude, opinion or feeling toward something, such as a person, organization, product or location. Any suitable cognitive state analysis tools may be used in embodiments of the invention. For instance, one suitable cognitive state analysis tool is the Watson Cognitive state Analysis tool provided by the International Business Machines Corporation. Other suitable cognitive systems may also be used in embodiments of the invention.

IBM Watson's Developer Cloud Services APIs provide easy-to-use mechanisms to identify cognitive state attributes within any document or webpage. The Developer Cloud Services APIs are capable of computing document-level cognitive state analysis, cognitive state for user-specified targets, entity-level cognitive state, quotation-level cognitive state, directional-cognitive state and keyword-level cognitive state. These multiple modes of cognitive state analysis provide for a variety of use cases ranging from social media monitoring to trend analysis.

For example, IBM Watson's Developer Cloud Services may look for words that carry a positive or negative connotation then figures out which person, place or thing they are referring to. It may also understands negations (i.e. "this car is good" vs. "this car is not good") and modifiers (i.e. "this car is good" vs. "this car is really good"). The Developer Cloud Services APIs work on documents large and small, including news articles, blog posts, product reviews, media files, comments and social media messages such as Tweets.

Also, the user's cognitive state may be based on the content of the search query, based on other information, or based on the content of the search query in combination with other information. This other information may include, for example, the result of the search query, how the user acts or responds to the search results, other actions of the user, events occurring in the user's life, mentions on social media, or a user profile.

As an example, an implementation of the invention may be a person who is happy typically buys x, determine that the person is happy, show results for x. More generally, an embodiment of the invention, as an example, may determine that when a user has a specific cognitive state, the user typically buys or interacts with results related to a particular item. The system determines the user has that specific cognitive state, therefore show content related to the particular item.

Outside factors beyond just the terms specifically used herein may be used. As an example, understanding if someone is about to have a baby from their social media posts outside the search engine. Or if someone is going through a breakup. For example, a search for snacks for someone going through a breakup might be ice cream and chocolate based on a time in that person's life when they had gone through a breakup in the past and made similar purchases. Whereas another person might be recommended bananas and granola because when they went through a breakup they wanted to get in shape and change their lives. Same search "snacks" but each person had a different "first search" interaction for that "cognitive state".

Cognitive state could also include biometrics, like how a person is feeling. IoT data can also be tapped into. For example, the IoT can be tapped into to determine if a person has walked 5,000 steps today? Or just 1 k?

Figure 3:
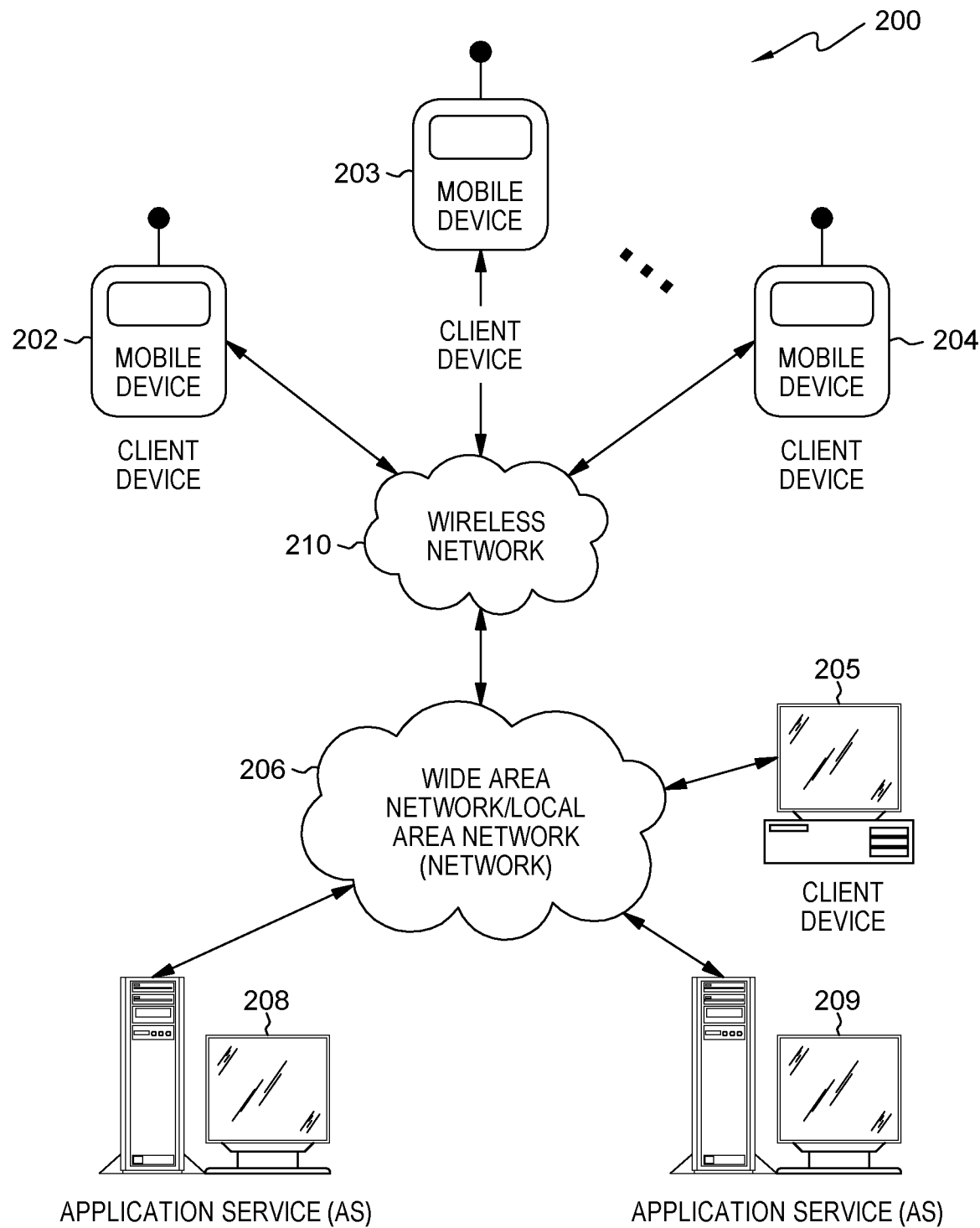
FIG. 3 depicts a computer network environment that may be used to implement embodiments of the invention.

FIG. 3 shows components of an exemplary environment 200 in which the invention may be practiced. Not all the illustrated components may be required to practice the invention, and variations in the arrangement and type of the components may be made without departing from the spirit or scope of the invention. As shown, system 200 of FIG. 3 includes local area networks ("LANs")/wide area network 206, wireless network 210, mobile devices 202-204, client device 205, and application services (AS) 208-209.

Generally, mobile devices 202-204 may include virtually any portable computing device that is capable of receiving and sending a message over a network, such as networks 206 and wireless network 210. Such devices include portable devices, such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 202-204 typically range widely in terms of capabilities and features.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 202-204 may each receive messages sent from AS 208-209, from one of the other mobile devices 202-204, or even from another computing device. Mobile devices 202-204 may also send messages to one of AS 208-209, to other mobile devices, or to client device 205, or the like. Mobile devices 202-204 may also communicate with non-mobile client devices, such as client device 205, or the like.

Wireless network 210 is configured to couple mobile devices 202-204 and its components with network 206. Wireless network 210 may include any of a variety of wireless sub-networks that may further overlay stand-alone ad-hoc networks, and the like, to provide an infrastructure-oriented connection for mobile devices 202-204. Such sub-networks may include mesh networks, Wireless LAN (WLAN) networks, cellular networks, and the like.

Network 206 is enabled to employ any form of computer readable media for communicating information from one electronic device to another. Also, network 206 can include the Internet in addition to local area networks (LANs), wide area networks (WANs), direct connections, such as through a universal serial bus (USB) port, other forms of computer-readable media, or any combination thereof.

AS 208-209 include virtually any device that may be configured to provide an application service. Such application services or simply applications include, but are not limited to, email applications, search applications, video applications, audio applications, graphic applications, social networking applications, text message applications, or the like. In one embodiment, AS 208-209 may operate as a web server. However, AS 308-309 are not limited to web servers.

Those of ordinary skill in the art will appreciate that the architecture and hardware depicted in FIG. 7 may vary.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A computer-implemented method of generating and ranking search results from an input query from a user, the method comprising:
   receiving, by a computer system, a first search query from a user when the user enters the first search query at a site;
   determining, by the computer system, a defined cognitive state of the user at a time the user enters the first search query at the site;
   receiving, by the computer system, a second search query from the user when the user returns to the site, wherein the first search query is previous to the second search query;
   processing the second search query and identifying, by the computer system, a set of search results for the second search query;
   ranking, by the computer system, the set of search results for the second search query based, at least in part, on the determined defined cognitive state of the user at the time the user entered the first, previous search query at the site, and wherein said determined defined cognitive state of the user is determined prior to the second search query:
   determining a cognitive state of the user when the user makes the second search query; and
   determining a correlation of the cognitive state of the user when the user makes the second query with the cognitive state of the user when the user makes the first search query; and wherein:
      the ranking the set of search results includes ranking the set of search results on a basis of said correlation and information about purchases made by the user at the time of the first search query; and
      the cognitive state analysis includes user-specified targets, entity-level cognitive state, quotation-level cognitive state, directional-cognitive state, and keyword level cognitive state.

2. The method according to claim 1, wherein the ranking the set of search results includes:
   forming one ranking of the set of search results; and
   modifying said one ranking on the bases of said correlation.

3. The method according to claim 1, wherein the determining a cognitive state of the user when the user makes the first search query includes determining the cognitive state of the user when the user makes the first search query by analyzing a content of the first search query.

4. The method according to claim 3, wherein the determining a cognitive state of the user when the user makes the second query includes determining the cognitive state of the user when the user makes the second search query by analyzing a content of the second search query.

5. The method according to claim 1, wherein:
   the first search query is a part of a first search session;
   the method further comprises identifying specified information about the first search session; and
   the ranking the set of search results includes using said specified information in the ranking of the set of search results.

6. The method according to claim 5, wherein:
   the method further comprises identifying a plurality of search results in the first search session; and
   the specified information includes one or more of the plurality of search results identified in the first search session.

7. The method according to claim 6, wherein the specified information includes a specified action taken by the user relating to the one or more of the plurality of search results.

8. A computer system for generating and ranking search results from an input query from a user, wherein the user makes a first search query when the user enters the first search query at a site and a defined cognitive state of the user at a time the user enters the first search query at the site is determined, the computer system comprising:
   a memory unit for storing data; and
   one or more processing units connected to the memory for transmitting data to and receiving data from the memory, the one or more processing units configured for:
      receiving a second search query from the user when the user returns to the site, wherein the first search query is previous to the second search query;
      identifying a set of search results responding to the second search query;
      ranking the set of search results for the second search query based, at least in part, on the determined defined cognitive state of the user at the time the user entered the first, previous search query the user entered, wherein said determined defined cognitive state of the user is determined prior to the second search query;
      determining a cognitive state of the user when the user makes the second search query; and
      determining a correlation of the cognitive state of the user when the user makes the second query with the cognitive state of the user when the user makes the first search query; and wherein:
         the ranking the set of search results includes ranking the set of search results on a basis of said correlation and information about purchases made by the user at the time of the first search query; and
         the cognitive state analysis includes user-specified targets, entity-level cognitive state, quotation-level cognitive state, directional-cognitive state, and keyword level cognitive state.

9. The system according to claim 8, wherein:
   the first search query is a part of a first search session;
   the method further comprises identifying specified information about the first search session; and
   the ranking the set of search results includes using specified information about the first search session in the ranking of the set of search results.

10. The system according to claim 9, wherein:
    a plurality of search results are identified in the first search session; and the specified information includes a specified action taken by the user relating to the one or more of the plurality of search results identified in the first search session.

11. A computer program product for generating and ranking search results from an input query from a user, wherein the user makes a first search query when the user enters the first search query at a site and a defined cognitive state of the user at a time the user enters the first search query at the site is determined, the computer program product comprising:
- a computer readable storage medium having program instructions embodied therein, the program instructions executable by a computer to cause the computer to:
  - receive, by the computer, a second search query from the user when the user returns to the site, wherein the first search query is previous to the second search query;
  - identify, by the computer, a set of search results responding to the second search query;
  - rank, by the computer, the set of search results for the second search query based, at least in part, on the determined defined cognitive state of the user at the time the user entered the first, previous search query at the site, wherein said determined defined cognitive state of the user is determined prior to the second search query;
  - determine a cognitive state of the user when the user makes the second search query; and
  - determine a correlation of the cognitive state of the user when the user makes the second query with the cognitive state of the user when the user makes the first search query; and wherein:
    - ranking the set of search results includes ranking the set of search results on a basis of said correlation and information about purchases made by the user at the time of the first search query; and
    - cognitive state analysis includes user-specified targets, entity-level cognitive state, quotation-level cognitive state, directional-cognitive state, and keyword level cognitive state.

12. The method according to claim 1, further comprising:
correlating the cognitive state of the user when the user makes the second search query with cognitive states of the user determined at times of previous search sessions to determine correlated cognitive state information, said previous search sessions including when the user makes the first search query; and wherein
the ranking the set of search results includes modifying the search results based on the correlated cognitive state information.

* * * * *